United States Patent [19]

McKenney

[11] 3,804,526
[45] Apr. 16, 1974

[54] WHEEL ALIGNMENT APPARATUS

[75] Inventor: John D. McKenney, South Laguna, Calif.

[73] Assignee: Royal Industries, Inc., Osseo, Minn.

[22] Filed: Sept. 18, 1972

[21] Appl. No.: 289,960

[52] U.S. Cl. ............................... 356/155, 356/152
[51] Int. Cl. ........................................ G01b 11/275
[58] Field of Search ............................ 356/155, 152

[56] References Cited
UNITED STATES PATENTS

| | | | |
|---|---|---|---|
| 2,692,527 | 10/1954 | Wetzel et al. | 356/152 |
| 3,533,699 | 10/1970 | Hopkins et al. | 356/155 X |
| 3,709,609 | 1/1973 | Spengler et al. | 356/155 X |
| 3,630,623 | 12/1971 | Schirmer | 356/155 |

Primary Examiner—Ronald L. Wibert
Assistant Examiner—Paul K. Godwin

[57] ABSTRACT

Wheel alignment apparatus using a modulated beam of light or radiant energy to determine the attitude of an operational axis of a vehicle with respect to a reflective reference means. A pair of light responsive sensors are disposed on a device that may be attached to a wheel on a vehicle. The energy reflected to each may then be a measure of the attitude of the wheel or its axis with respect to a reference such as the reflector. Means are provided to indicate when each of the sensors is receiving sufficient light energy to prevent false indication of a predetermined alignment relationship. Means are also provided to modify the sensitivity of the sensors in accordance with the relative distance from a reflective reference.

11 Claims, 4 Drawing Figures

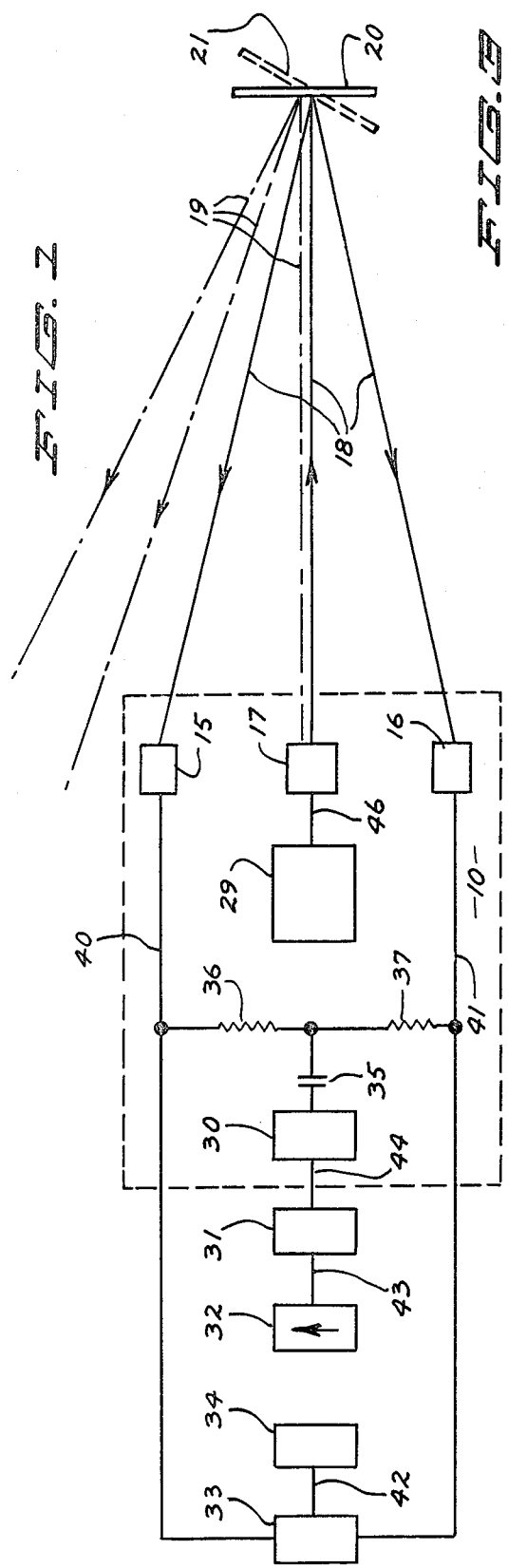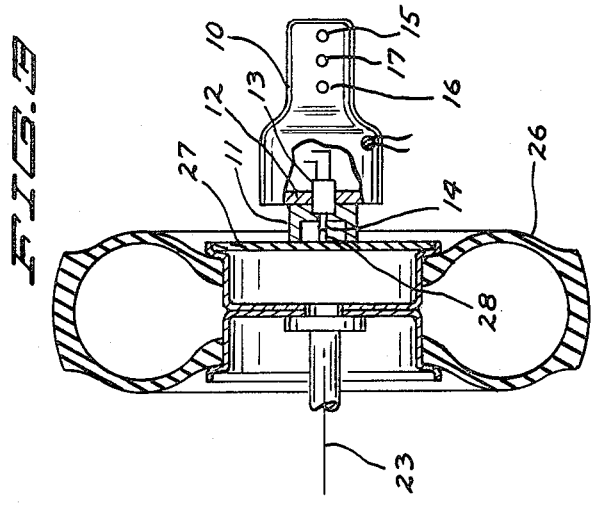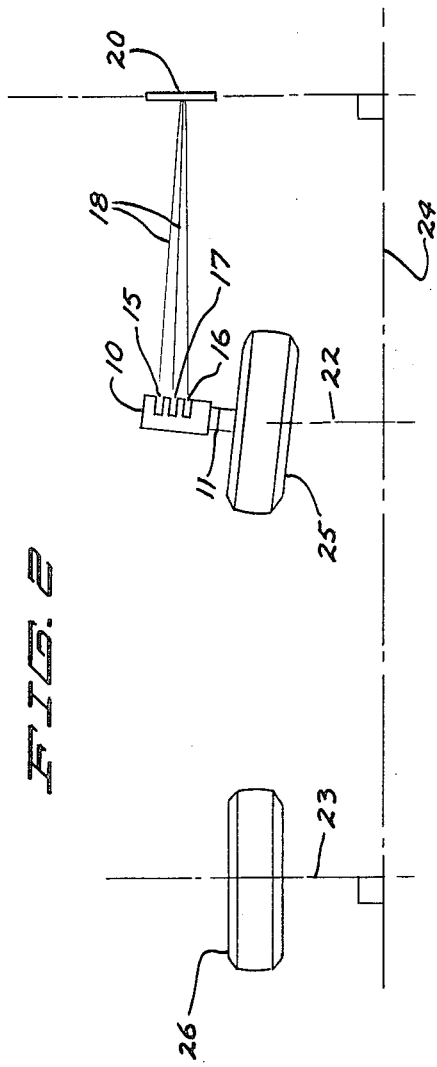

3,804,526

WHEEL ALIGNMENT APPARATUS

BRIEF SUMMARY OF THE INVENTION

It is an object of my invention to provide improved apparatus for measuring or determining the attitude of one axis of the operational elements of a wheeled vehicle with respect to another axis of the vehicle that is used as a reference.

It is another object of my invention to provide apparatus for accomplishing the foregoing results which is substantially immune to the effects of environmental characteristics affecting such determinations.

These and other objects of my invention are accomplished through the use of a detachable source and sensor of rays of radiant energy which are provided in a modulated form to be directed to and reflected from a reflective reference which is adjustably disposed in relation to a vehicle, several of the axes of elements of which, are to be tested or aligned, one with respect to another or others. Further means are provided to obtain the objects of the invention through adjusting the sensitivity of the measuring or attitude determining means whereby the effects of distance or the like are compensated for so that a standard uniform determination may be made under varying circumstances. My invention also provides for insuring that the validity of the determinations which are accomplished is unaffected by unduly large deviations from a desired predetermined relative attitude in the relationship between the source of radiant energy, the reflective reference and the radiant energy responsive sensing means whereby apparatus incorporating the principles of my invention will not provide a false indication of proper alignment where such alignment is not actually in existence.

BRIEF DESCRIPTION OF THE DRAWINGS

FIG. 1 is a schematic and diagrammatic sketch illustrating part of a wheel alignment apparatus for an automobile incorporating the principles of my invention;

FIG. 3 is an enlarged fragmentary sectional diagram of the rear wheel of an automobile or vehicle to which a portion of the apparatus of this invention has been applied for purposes to be described below; and FIG. 4 is a schematic and diagrammatic representation of the apparatus illustrated in FIGS. 1, 2 and 3 above.

Figure 2:
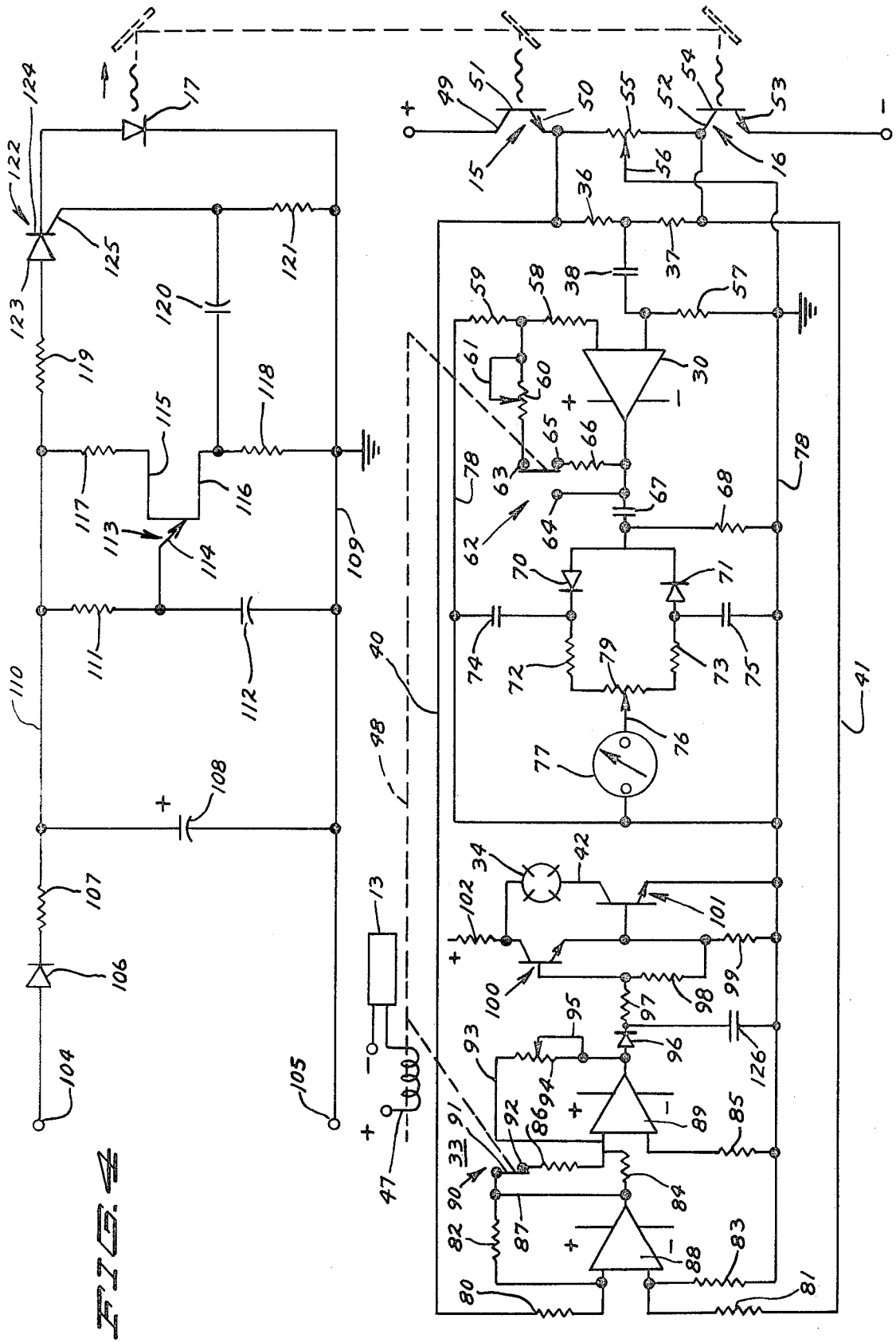
FIG. 2 is a top diagrammatic sketch of a portion of an automobile or vehicle system illustrating the application of the apparatus of FIG. 1 of the drawing.

Referring now to the drawings, a wheel head, is indicated generally by reference character 10. Wheel head 10 is intended to be removably attached in predetermined angular relationship to one of the elements, such as a wheel, of the suspension or supporting system of a vehicle as might be seen in copending application Ser. No. 212,773, filed Dec. 27, 1971, assigned to the assignee of this invention which in turn refers to U.S. Pat. No. 3,171,208, issued Mar. 2, 1965, to Baxter Bender. Wheel head 10 is intended to be operative in combination with a reflective reference that is adjustably disposed so as to provide a reference line or plane in a predetermined attitude with respect to one or more reference axes or planes of a vehicle. The reflective means is indicated generally by reference character 20 and is shown, for example, on FIG. 2 of the drawings as being disposed perpendicular to the longitudinal axis, 24, of a vehicle, and on FIG. 4 in a functional diagrammatic representation.

Wheel head 10 is shown on FIG. 1 as including a source of energy known as a pulser 29 that is connected by conductor 46 to a source of radiant energy 17 from which radiant energy rays 18 and 19 are shown directed to and reflected from reflective means 20 and 21, respectively. Wheel head 10 is also shown including a pair of radiant energy detecting elements 15 and 16 which are connected to an amplifier 30 through conductor 40, resistor 36 and capacitor 35 and conductor 41, resistor 37 and capacitor 35, respectively.

Photodetectors 15 and 16 are also connected to a pair of input terminals on a comparator-amplifier 33, through conductors 40 and 41. Comparator-amplifier 33 is also connected to an indicator 34 through conductor 42. The output of amplifier 30, which is preferably a positive or negative signal is connected to a detector 31 through conductor 44. Detector 31 is connected to a meter 32 through conductor 43. Wheel head 10 also includes a magnet 11 that has a centrally located outwardly opening recess 12 and a switch disposed therein for actuation by a complementary shaped activating element 28 (FIG. 3) for purposes to be described below. Magnet 11 may be of the type illustrated and described in the above noted copending application.

As constituted in FIG. 1 of the drawings, the diagrammatic form illustrated may be utilized in conjunction with the diagrammatic illustration of a toe-in alignment system illustrated in FIG. 2. In FIG. 2, wheel head 10 is shown disposed and held on the hub of a front wheel 25 of the wheel by magnet 11. The longitudinal axis of the vehicle is indicated by reference character 24, the axis of rotation of front wheel 25 is indicated by reference character 22 and the axis of rotation of rear wheel 26 is indicated by reference character 23 as being perpendicular to the longitudinal axis 24 of the vehicle. Axis 22 of the front wheel 25 may or may not be in a perpendicular relationship with longitudinal axis 24 and, as is normally the case, would be at a slight angle to provide for the customary toe-in required for proper adjustment of the steering apparatus of a vehicle.

A reflective reference 20 is shown having its plane of reflection perpendicular to longitudinal axis 24. Wheel head 10 is shown with its source of radiant energy 17 and photocells 15 and 16 in a predetermined relationship with respect to radiant energy rays 18. As is explained in the foregoing copending application, magnet 11 on wheel head 10 is preferably comprised of a device which may provide for a predetermined angular displacement from the axis of rotation of the wheel to which it is attached for purposes of disposing the axis of rotation of the wheel at a predetermined angular relationship with other axes of the vehicle, in the instance of toe-in, at a small angle with regard to the longitudinal axis, 24, of the vehicle.

In considering the operation of the apparatus illustrated in FIGS. 1 and 2 of the drawings, reference is made to FIG. 3 of the drawings which is a partially sectional view of a rear wheel, a fragmentary view of an axle and a partially sectional view of a wheel head 10 attached thereto. In FIG. 3, a disc or plate of material 27 is shown disposed on the rim of wheel 26 and includes a centrally disposed outwardly extending pin 28.

When magnet 11 on wheel head 10 is in engagement with the surface of disc 27, pin 28 engages actuator 14 on switch 13 for purposes to be discussed below. Magnet 11 is adjusted so that the axis of wheel head 10 is coincident with the axis 23 of wheel 26. Since the axis of rotation of a rear wheel of a vehicle is normally considered to be perpendicular to the longitudinal axis of a vehicle, it is possible to use either of the rear wheels to calibrate, or set a reference. In the illustrated embodiment, wheel head 10 is disposed on rear wheel 26 in the relationship just described and reflective reference, mirror 20, is rotated about its axes until it is perpendicular to longitudinal axis 24 of a vehicle. This will be indicated by meter 32 and indicator 34. Following this, magnet 11 is adjusted to provide an offset in the longitudinal axis of wheel head 10 with respect to the plane of a wheel to which it may be attached so that when wheel head 10 is again positioned in alignment with reflective reference 20, axis of rotation 22 of a front wheel 25 will be disposed at a small angle with respect to longitudinal axis 24 to provide the necessary or desired toe-in of a front wheel.

In the top view of FIG. 2 of the drawings, wheel head 10 is magnetically disposed on the outer face of the hub of front wheel 25 and, since the outer face of the hub of a wheel is normally disposed perpendicular to the axis of rotation of the wheel, the above described relationship will be obtained upon proper adjustment of the toe-in of wheel 25.

Referring to FIG. 1 of the drawings, radiant rays 18 indicate the relationship of the various elements of my invention when alignment has been obtained. At this time, the signal appearing across resistors 36 and 37 is equal and oppsite and cancels out, there is no signal to amplifier 30; hence the output of detector 31 remains at a predetermined level and meter 32 will be centered to indicate alignment. Simultaneously signals are applied to amplifier-discriminator 33 which then provides an output to indicator 34 indicating that a true, as distinguished from false, alignment has been obtained. Hence, the indication of alignment displayed on meter 32 is verified by illumination of indicator 34. It may be clear to those skilled in the art that other forms of verification of a true rather than false alignment may be utilized. For example, the output of amplifier-discriminator 33 might be utilized to control a gate connected to meter 32 which would render it inoperative except under those conditions of proximity to alignment in the relationship between wheel head 10 and reflective reference 20.

FIG. 1 shows a set of radiant rays 19 which indicate a condition of false alignment that could result in meter 32 indicating proper alignment even though the radiant ray emanating from source 17 is not perpendicular to reflective reference 20 (note returning rays 19 do not impinge on either of photocells 15 and 16.) Under these conditions, since the output of photocells 15 and 16 is equal, meter 32 will again indicate alignment by having its needle at a central position. However, indicator 34 will not be energized since there is no output from either or both of photocells 15 and 16 and the operator will know that the apparatus is not operative to provide its normal desired function.

It may also be possible to use wheel head 10 without an adjustable magnet. Under this condition, meter 32 will directly indicate the relative attitude of wheel 25.

Referring now to FIG. 4 of the drawings, a complete schematic and functional diagram further illustrates one operative embodiment of my invention. In FIG. 4, source of radiant energy 17 is shown energized from a pair of input terminals 104 and 105, adapted to be connected to a suitable source of alternating current energy, in the following manner. The anode of source of radiant energy 17 is connected to conductor 109 that is in turn connected to ground. The cathode of source of radiant energy 17 is connected to terminal 104 through anode 124 on silicon controlled rectifier 122, cathode 123 on silicon controlled rectifier 122, resistor 119, conductor 110, resistor 107, and diode 106 connected to terminal 104. A capacitor 108 is connected from conductor 109 to conductor 110 and resistor 111 and capacitor 112 are disposed between conductors 110 and 109. A uni-junction transistor 113 is shown having its emitter 114 connected to the junction between resistor 111 and 112, one base thereof, 115, connected to conductor 110 through resistor 117 and the other base, 116, connected to conductor 109 through resistor 118. Base 116 is also connected to trigger electrode 125 on silicon controlled rectifier 122 through capacitor 120. Trigger electrode 125 on silicon controlled rectifier 122 is also connected to conductor 109 through resistor 121.

Photoelectric sensors 15 and 16, are shown in the form of phototransistors, having collector electrodes 49 and 52, emitter electrodes 50 and 53, and base electrodes 51 and 54, respectively, are shown connected across a source of direct current energy, not shown, by having collector electrode 49 connected to a positive terminal, emitter electrode 50 connected to collector electrode 52 through potentiometer winding 55 and emitter electrode 53 connected to a negative terminal. Wiper 56, assocated with potentiometer winding 55, is connected to ground through conductor 78. Emitter electrode 50 on photocell 15 is connected to resistor 36 and collector electrode 52 on photocell 16 is collected to resistor 37. Resistors 36 and 37 have their opposite ends directly connected to capacitor 38 that is in turn connected to an input terminal and amplifier 30 and to ground through resistor 57. Amplifier 30 is shown adapted for connection to a suitable source of direct current energy (not shown). Amplifier 30 is shown having an output terminal connected to a further input terminal through resistor 66, stationary contact 65 on switch 62, movable contact 63 on switch 62, potentiometer winding 60, potentiometer wiper 61 and resistor 58. The output of amplifier 30 is also connected to stationary contact 64 on switch 62.

A detector is connected to the output of amplifier 30 and includes a pair of diodes 70 and 71 and a pair of resistors 72 and 73, connected so as to form a bridge with the junctions between the resistors and diodes connected to ground conductor 78 through capacitors 74 and 75, respectively. Ground conductor 78 is also connected to resistor 58 through resistor 59. The other ends of resistors 72 and 73 are connected to a potentiometer winding 79 and the other ends of diodes 70 and 71 are connected to the output of amplifier 30 through capacitor 67 and to ground conductor 78 through resistor 68. A meter, 77, is shown connected between ground conductor 78 and potentiometer wiper 76 to provide an indication of the fluctuating polarity and amplitude of the signal from detector circuit.

Emitter 50 on photocell 15 is shown connected to an input terminal on amplifier-discriminator or operational amplifier 88 through conductor 40 and resistor 80 and the collector 52 on photocell 16 is shown connected to a further input terminal on amplifier-discriminator 88 through conductor 41 and resistor 81. The last named input terminal on amplifier-discriminator 88 is connected to ground through resistor 83. The output of amplifier 88 is connected to the other input terminal through conductor 87 and resistor 82.

The output of amplifier-discriminator 88 is also connected to a first input terminal on amplifier 89 through resistor 84. The other input terminal on amplifier 89 is connected to ground through resistor 85. The other input terminal on amplifier 89 is also connected to the output of amplifier-discriminator 88 through resistor 66, stationary contact 92 on switch 90 and movable contact 91 on switch 90. The output of amplifier 89 is connected to the first input terminal through potentiometer winding 94, potentipmeter wiper 95 at conductor 93.

The output of amplifier 89 is also connected to the input terminal of transistor 100 through diode 96 and resistor 97 and to ground from resistor 97 through resistor 98 and resistor 99. The collector of transistor 100 is connected to a positive source of potential (not shown) through resistor 102 and to one terminal of an indicator lamp, 34. The emitter of transistor 100 is connected to the base electrode of a further transistor 101 which in turn has its collector connected to the other terminal of indicator lamp 34 and through conductor 42 and its emitter terminal connected to ground conductor 78.

The following is a table of values of the elements utilized in the construction of an operative embodiment of FIG. 4 of the drawings:

| Reference Characters | Identification |
|---|---|
| 106 | Type S 1010 diode |
| 107 | 0.47 ohm resistor |
| 108 | 100 microfarad capacitor |
| 111 | 56 K ohm resistor |
| 112 | 0.1 microfarad capacitor |
| 113 | Type 2N2646 uni-junction transistor |
| 117 | 150 ohm resistor |
| 118 | 100 ohm resistor |
| 119 | 0.33 ohm resistor |
| 120 | 0.0018 microfarad capacitor |
| 122 | Type C 106Y4 silicone controlled rectifier |
| 121 | 1 K ohm resistor |
| 17 | Type ME5A diode |
| 15 | Tupe L14A502 phototransistor |
| 16 | Type L15A502 phototransistor |
| 55 | 500 K ohm potentiometer |
| 36 | 150 K ohm resistor |
| 37 | 150 K ohm resistor |
| 38 | 0.3 microfarad capacitor |
| 30 | Type MC1458CP1 operational amplifier |
| 57 | 2.2 meg ohm resistor |
| 58 | 2.2 meg ohm resistor |
| 59 | 1 K ohm resistor |
| 60 | 5 K ohm potentiometer |
| 66 | |
| 67 | 10 microfarad capacitor |
| 68 | 10 K ohm resistor |
| 70 | Type HP5082-281 diode |
| 71 | Type HP5082-281 diode |
| 72 | 27 K ohm resistors |
| 73 | 27 K ohm resistor |
| 74 | 2 microfarad capacitor |
| 75 | 2 microfarad capacitor |
| 79 | 20 K ohm potentiometer |
| 80 | 2.2 meg ohm resistor |
| 81 | 2.2 meg ohm resistor |
| 82 | 1 meg ohm resistor |
| 83 | 1 meg ohm resistor |
| 84 | 1 K ohm resistor |
| 85 | 1 K ohm resistor |
| 86 | |
| 88 | Type MC58CP1 operational amplifier |
| 89 | Type MC1741CI1 amplifier |
| 94 | 10 K ohm potentiometer |
| 96 | Type S1010 diode |
| 97 | |
| 98 | |
| 99 | |
| 102 | 35 ohm resistor |
| 100 | Type 2N1711 transistor |
| 101 | Type 2N5869 transistor |
| 34 | No. 313, lamp, 165 ohm |
| 126 | 20 microfarad capacitor |

In the operation of FIG. 4, it may be seen that the apparatus shown in the top of the figure serves as a pulser and source of radiant energy and diode 17 may be seen to periodically emit pulses of radiant energy which are exemplified by the sine wave emanating from diode 17 toward the representation of a reflective reference from which the train of pulses or modulated radiant energy is deflected downwardly to further representaitons of the reflective reference to cause like signals to be applied to phototransistors 15 and 16.

The operation of amplifier-comparator 30 and the detector circuit is believed to be within the capabilities of one skilled in the art and will not be described in detail except as to note that switch 13 is operative to energize a relay winding 47 which, through its driving means 48, is operative to actuate switches 62 and 90 in accordance with its relative relationship or distance from reflective reference 20. When switch 13 is closed by actuation as in FIG. 3 of the drawings, relay winding 47 is energized to modify or change the state of switches 62 and 90 from that shown in the drawings to a reverse position to modify the sensitivity or gain of amplifier-comparator 30 and amplifier-comparator 88 in accordance with the relative difference in distance from reflective reference 20 as, for example, the difference between the distance front wheel 25 and rear wheel 26 from reflective reference 20. This results in a substantially uniform output signal as applied to meter 77 and the energizing circuitry for indicator lamp 34.

When the circuitry shown in the lower portion of FIG. 4 is energized and utilized as in the position of FIG. 2 on the front wheel of vehicle, the operation is the same as described above and need not be repeated.

The energization of indicator lamp 34 may be considered in its broadest light as constituted in the illustrated embodiment as a means for energizing indicator lamp 34 whenever phototransistors 15 and 16 are each receiving some radiant energy and the total received is above a predetermined minimum value as might be determined by the gating function performed by diode 96 in the left end of the lower portion of the schematic of FIG. 4 of the drawings. The gating threshold is chosen so as to preclude energization of indicator lamp 34 when only one of the phototransistors is receiving radiant energy from diode 17 reflected through reflective reference 20 so that, for all practical purposes, the illustrated embodiment will not energize indicator lamp 34 to indicate alignment or proximity to alignment whenever neither of phototransistors 15 or 16 is receiving modulated radiant energy from diode 17.

Having now therefore fully illustrated and described my invention, what I claim to be new and desire to protect by Letters Patent is:

1. In automobile wheel alignment apparatus of the class above described, the combination comprising:
   a. a source of radiant energy;
   b. first and second means responsive to said source of energy operable to provide an output signal to an indicating means;
   c. radiant energy reflective reference means;
   d. means mounting said source of radiant energy and said first and second means so that said first and second means are each adjacent to said source of energy and said first and second means and said source of radiant energy disposed on an axis with a predetermined relationship to an axis of operation of a portion of a vehicle so that said source of energy is directed toward said reflective reference means; and
   e. further means, connected to said first and second means, and operable to indicate simultaneous energization of said first and second means by the energy reflected from said reference.

2. The apparatus of claim 1 in which means are provided on the mounting means for adjusting the sensitivity of said output signals in accordance with the distance of said mounting means from said reflective means.

3. The apparatus of claim 1 in which the further means is operable to indicate unequal energization of the first and second means.

4. The apparatus of claim 1 in which the further means includes means for comparing the output signals of the first and second means.

5. The apparatus of claim 1 in which the further means includes means for summing the output signals of the first and second means.

6. The apparatus of claim 5 in which the means in the further means includes means for rejecting all signals of less than a predetermined magnitude.

7. In apparatus of the class above described, the combination comprising;
   a. a source of radiant energy;
   b. first and second means responsive to said source of energy to provide output signals to an indicating means;
   c. radiant energy reflective reference means;
   d. mounting means for said source of radiant energy and said first and second means in a device adapted to be disposed on an axis of operation of a portion of a vehicle so that said source of energy is directed toward said reflective reference means; and
   e. means on said mounting means for adjusting the sensitivity of said output signals in accordance with the distance of said mounting means from said reflective means.

8. The apparatus of claim 7 in which a further means is connected to said first and second means and operable to indicate simultaneous energization of said first and second means.

9. In apparatus of claim 7 in which the means on the mounting means is a switch adapted to be energized from an indicia of distance from the reflective reference.

10. In apparatus of claim 9 in which the indicia is an actuator for the switch, said actuator being disposed on the vehicle.

11. In apparatus of claim 10 in which the indicia is disposed on a reference base member adapted to be removably disposed on the vehicle.

* * * * *